(12) United States Patent
Solomon

(10) Patent No.: US 6,574,903 B2
(45) Date of Patent: Jun. 10, 2003

(54) WATERFOWL DECOY WITH REALISTIC MOTION AND INTERCHANGEABLE WINGS AND FEET

(76) Inventor: Walter Solomon, 505 N. Price, Marshall, TX (US) 75670

( * ) Notice: Subject to any disclaimer, the term of this patent is extended or adjusted under 35 U.S.C. 154(b) by 0 days.

(21) Appl. No.: 09/841,086

(22) Filed: Apr. 24, 2001

(65) Prior Publication Data

US 2002/0152666 A1 Oct. 24, 2002

(51) Int. Cl.⁷ ............................................. A01M 31/06
(52) U.S. Cl. .............................................................. 43/3
(58) Field of Search .................. 43/3, 2, 26.1; 446/156, 446/158; 40/417

(56) References Cited

U.S. PATENT DOCUMENTS

| | | | |
|---|---|---|---|
| 282,851 A | 8/1883 | Danz, Jr. | |
| 636,106 A | * 10/1899 | Biddle | 43/3 |
| 843,588 A | 2/1907 | Ditto | |
| 1,828,034 A | * 10/1931 | Einfalt | 446/158 |
| 2,229,175 A | * 1/1941 | Johnson | 43/3 |
| 2,443,040 A | * 6/1948 | Jones | 43/3 |
| 2,480,390 A | 8/1949 | Thompson | |
| 2,545,801 A | * 3/1951 | Wrazen | 40/417 |
| 2,638,705 A | * 5/1953 | Petrasy | 40/417 |
| 2,692,451 A | 10/1954 | Deuster | |
| 2,704,416 A | 3/1955 | Laird | |
| 2,747,314 A | 5/1956 | McGregor | |
| 2,799,960 A | 7/1957 | Riley | |
| 2,814,146 A | 11/1957 | Propp | |
| 2,835,064 A | 5/1958 | Webb | |
| 3,000,128 A | 9/1961 | McAda | |
| 3,628,286 A | * 12/1971 | Mashahiro | 446/158 |
| 3,736,688 A | 6/1973 | Caccamo | |
| 3,768,192 A | 10/1973 | Caccamo | |
| 4,128,958 A | 12/1978 | Snow | |
| 4,450,642 A | * 5/1984 | DeKezel et al. | 43/3 |
| 4,581,841 A | * 4/1986 | Gish | 446/156 |
| 4,620,385 A | * 11/1986 | Carranza et al. | 43/3 |
| 4,845,873 A | 7/1989 | Hazlett | |
| 4,896,448 A | 1/1990 | Jackson | |
| 5,003,722 A | 4/1991 | Berkley | |
| 5,144,764 A | 9/1992 | Peterson | |
| 5,168,649 A | 12/1992 | Wright | |
| 5,231,780 A | 8/1993 | Gazalski | |
| 5,636,466 A | 6/1997 | Davis | |
| 5,809,683 A | * 9/1998 | Solomon | 43/3 |
| 5,862,619 A | 1/1999 | Stancil | |
| 5,930,936 A | * 8/1999 | Parr et al. | 43/3 |
| 5,974,720 A | 11/1999 | Bowling | |
| 6,092,323 A | * 7/2000 | McBride et al. | 43/3 |
| 6,170,188 B1 | * 1/2001 | Mathews | 43/3 |
| 6,321,480 B1 | * 11/2001 | Solomon | 43/3 |
| 6,339,893 B1 | * 1/2002 | Solomon | 43/3 |
| 6,339,894 B1 | * 1/2002 | Solomon | 43/3 |
| 6,408,559 B2 | * 6/2002 | Mathews | 43/3 |
| 6,449,894 B1 | * 9/2002 | Price et al. | 43/3 |
| 6,484,431 B2 | * 11/2002 | Price et al. | 43/3 |

* cited by examiner

Primary Examiner—Darren W. Ark

(57) ABSTRACT

The present invention addresses an improved method of animating a waterfowl decoy or bird sculpture. An offset support assembly supports wing and paddle appendages that attach to a rotating or oscillating output shaft extending from the body of a waterfowl decoy or bird sculpture. The rotation or oscillation of the offset wing appendages produces a visual quality replicating the flapping of wings. The paddle appendages propel a floating decoy on the surface of the water and impart a side-to-side movement. The invention can be used to impart a more realistic motion and appearance to either floating or pole-mounted decoys, or can be used with decorative sculptures or models.

33 Claims, 5 Drawing Sheets

WATERFOWL DECOY WITH REALISTIC MOTION AND INTERCHANGEABLE WINGS AND FEET

TECHNICAL FIELD OF THE INVENTION

A waterfowl decoy device producing a realistic visual quality.

BACKGROUND OF THE INVENTION

The present invention is an improved method for animating a waterfowl decoy for attracting ducks or other waterfowl to a particular body of water or location in a body of water. Traditionally, hunters have used unanimated devices that resemble waterfowl with varying degrees of realism. These traditional designs did nothing more than float passively in the water or stand statically on a pole-mounted assembly. Such a traditional design is shown in U.S. Pat. No. 4,450,642 to DeKezel.

More recently, there have been attempts to give decoys some type and degree of motion in order to better simulate live waterfowl. One such moving waterfowl decoy is shown in U.S. Pat. No. 5,809,683 to Solomon. The ability to effect movement on the decoy disclosed and claimed in Solomon, however, was limited by the motor assembly and the wing design.

Overall, prior efforts to create a realistic form of motion in a waterfowl decoy have fallen short of producing lifelike motion and a realistic appearance. Further, many of the prior art designs have been complex, expensive to produce, and/or difficult to use. The present invention addresses a waterfowl decoy that produces a more realistic visual image with tremendous flexibility in the movements and visual effects.

SUMMARY OF THE INVENTION

The invention enhances the performance of a moving decoy by using an offset support assembly attached to a driver motor's shaft assembly. The driver motor provides the necessary power to rotate the shaft assembly and the offset support assembly. Appendages, such as a wing structures, are attached to the offset support assembly by an attachment bracket. This design offsets the attachment point of the appendage a radial distance from the longitudinal axis of the shaft assembly to move the appendage in a circular rotation around the longitudinal axis of the shaft assembly. The circular rotation of the shaft assembly with the rotating offset support assembly imparts a unique visual quality to the rotating wing appendages. Foot paddles may also be attached to the offset assembly to cause the decoy to move in the water. Wing types and foot paddles are interchangible, and different combinations of the appendages can produce different visual effects.

BRIEF DESCRIPTION OF THE DRAWINGS

The objects and features of the invention will become more readily understood from the following detailed description and appended claims when read in conjunction with the accompanying drawings in which like numerals represent-like elements and in which:

DETAILED DESCRIPTION OF THE PREFERRED EMBODIMENTS

Figure 1:
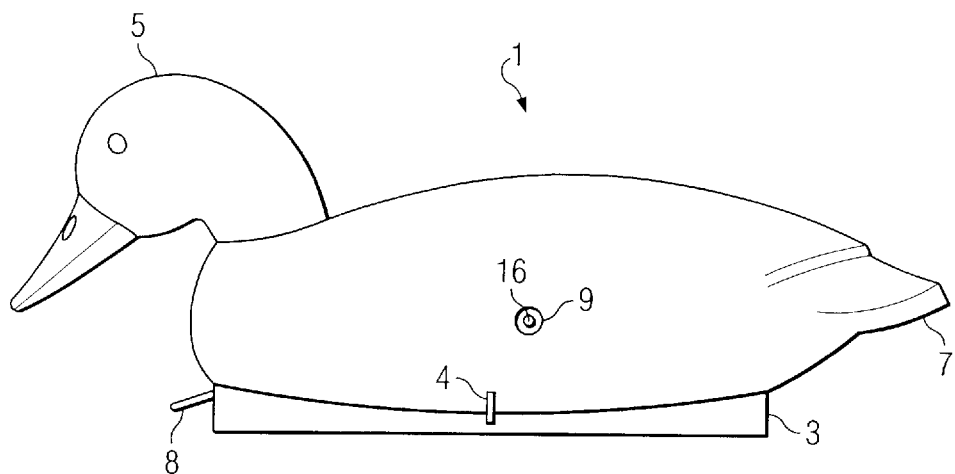
FIG. 1 is a side-view depiction of a waterfowl decoy with a output shaft.

The invention can be used to impart a more realistic appearance to either floating or pole-mounted decoys, or could be used with decorative sculptures, models, or other bird or bird appearing devices. As shown in FIG. 1, the decoy shell 1 is generally a hollow structure in the shape, form, and coloration of a duck or other waterfowl in which a drive mechanism can be easily mounted. The waterfowl decoy 1 has a head end 5, a tail end 7, and an anchor point 8. The decoy 1 has a driver motor internally mounted, and the driver motor has an output shaft 16 extending from a hole 9 in the side of decoy 1.

The bottom of the decoy 1 is comprised of a plastic foam bottom section 3 providing buoyancy for use in the water. A hole is also located in the bottom section so the decoy 1 can also be mounted on a pole assembly. A retaining hook 4 fastens the bottom section 3 into the decoy.

Figure 2:
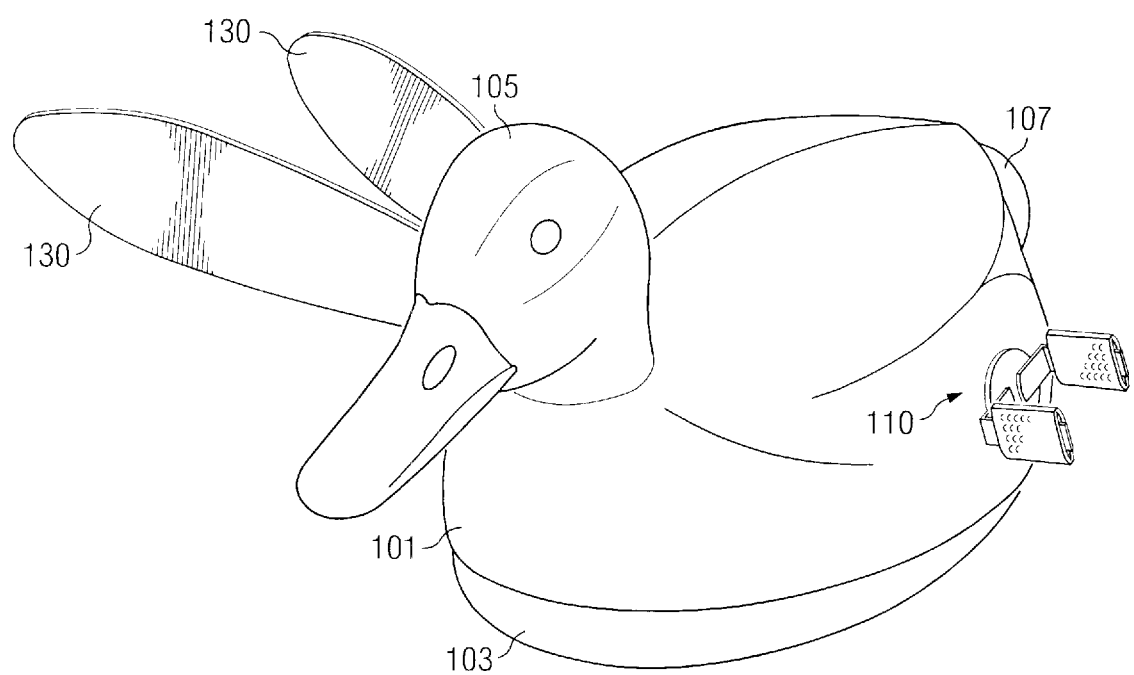
FIG. 2 shows a perspective view of a waterfowl decoy with an offset support assembly having two attachment brackets.

The invention operates through the use of an offset support assembly attached to the output shaft. As shown in FIG. 2, the decoy 101 includes the offset support assembly 110. The decoy 105 is a standard type decoy with a head end 105, tail end 107, and base 103.

The offset support assembly 110 is installed on the left side of the decoy 101. The left side of the decoy has an offset support assembly 110 without any appendages attached, while the right side is depicted with two wing appendages 130 attached. This offset support assembly 110 has two attachment brackets, and this offset support assembly could also depict the offset support assembly shown in FIG. 8 and FIG. 9.

The offset support assembly 110 is attached to the output shaft of a driver motor (not shown). As the driver motor rotates the output shaft (not shown), the offset support assembly 110 will rotate around a longitudinal axis defined along the length of the output shaft. The two attachment brackets on offset support assembly 110 allows for one or more appendages to be attached to the offset support assembly. When wings or other appendages are attached to the offset support assembly 110, these appendages will also rotate in a circular direction around the longitudinal axis defined by the output shaft.

Figure 3:
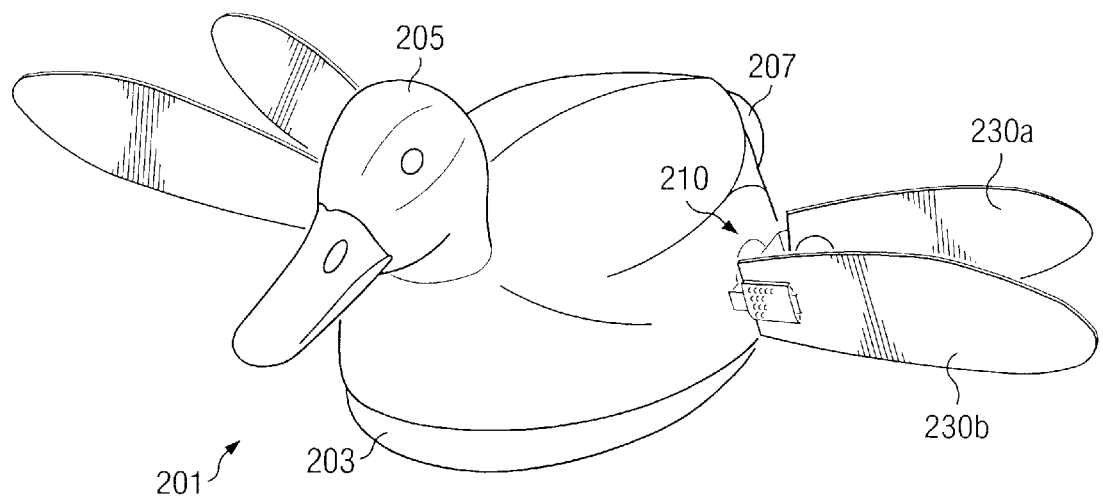
FIG. 3 shows a perspective view of a waterfowl decoy with an offset support assembly-having two attachment brackets and two wings attached.

FIG. 3 shows a decoy 201 with an offset support assembly 210 much like the offset support assembly shown in FIG. 2. The decoy 201 also has a head end 205, a tail end 207, and a base 203. The offset support assembly 210 has two attachment brackets with wing appendages 230a and 230b attached thereto.

The offset support assembly 210 is attached to the output shaft of a driver motor (not shown). As the driver motor rotates the output shaft (not shown), the offset support assembly 210 will rotate around a longitudinal axis defined along the length of the output shaft. The two attachment brackets on offset support assembly 210 allows for one or more appendages to be attached to the offset support assembly. Because wings 230a and 230b are attached to the offset support assembly 210, these appendages will rotate in a circular direction around the longitudinal axis defined by the output shaft. As shown in FIG. 3, wing appendages are installed on both sides of the decoy 201.

Figure 4:
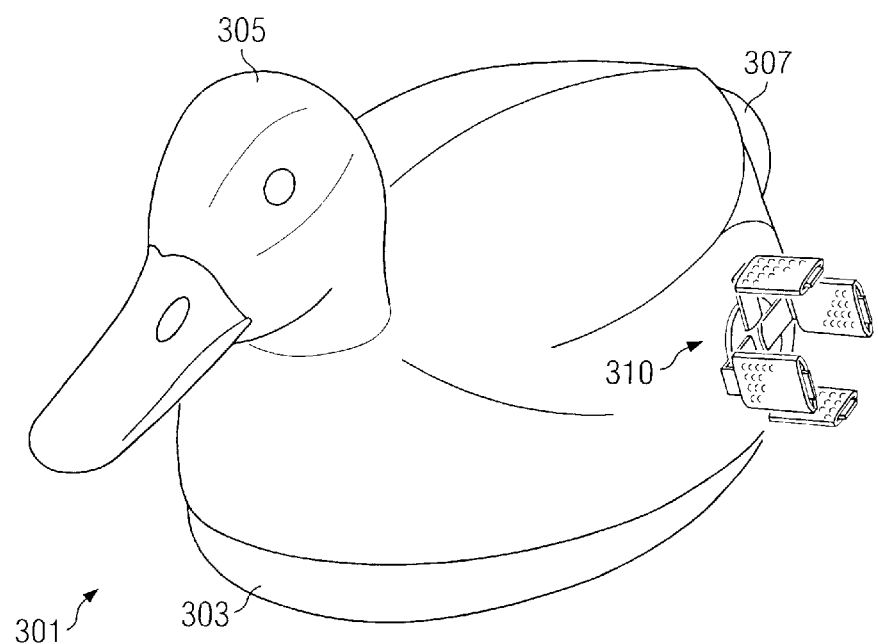
FIG. 4 shows a perspective view of a waterfowl decoy with an offset support assembly having four attachment brackets.

FIG. 4 shows a decoy 301 with a different type of offset support assembly 310 installed on its left side. The decoy 301 has a head end 305, a tail end 307, and a base 303. This offset support assembly 310 has four attachment brackets, and this offset support assembly 310 is similar to the offset support assembly shown in FIG. 12.

The offset support assembly 310 is attached to the output shaft of a driver motor (not shown). As the driver motor rotates the output shaft (not shown), the offset support assembly 310 will rotate around a longitudinal axis defined along the length of the output shaft. The four attachment brackets on offset support assembly 310 allows for one or more appendages to be attached to the offset support assembly. When wing appendages (or other appendages) are attached to the offset support assembly 310, these appendages will rotate in a circular direction around the longitudinal axis defined by the output shaft. Wing appendages or other appendages may be installed on both sides of the decoy 301.

Figure 5:
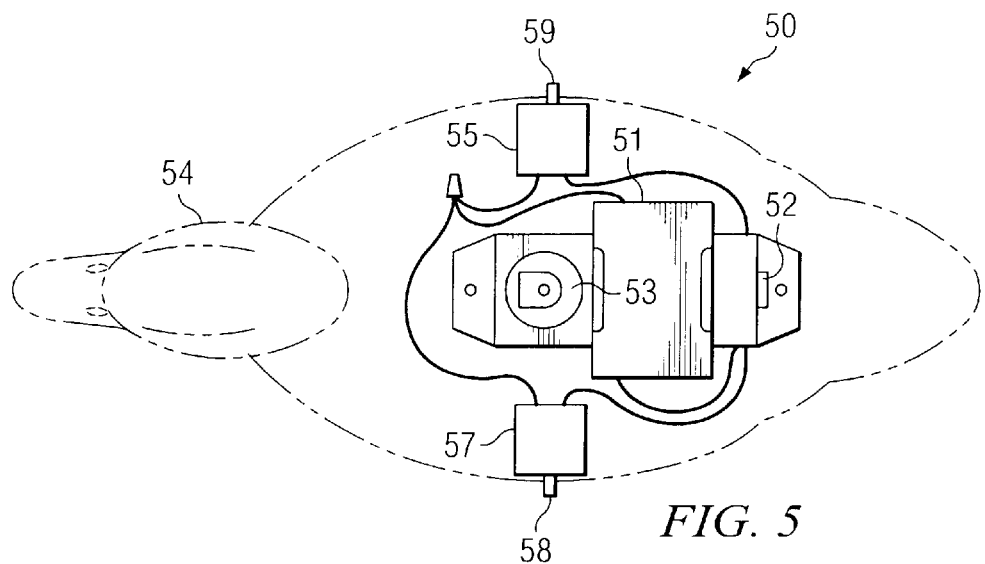
FIG. 5 shows bottom view of the waterfowl decoy with driver motors installed.

FIG. 5 shows one embodiment for a drive mechanism as installed in a waterfowl decoy 50. Decoy 50 has a head end 54, and two driver motor assemblies 55 and 57 attached to the sides of decoy 50. The driver motors can be any type of driver motor assembly that will rotate an output shaft on a decoy 50. The driver motor assemblies 55 and 57 should be oriented to rotate in opposing directions on either side of a decoy 50.

In the preferred embodiment, there are two electric driver motor assemblies 55 and 57. The left motor assembly 57 will rotate output shaft 58 in a counter-clockwise motion. The right motor assembly 55 will rotate output shaft 59 in a clockwise motion. The driver motor assemblies (55 and 57) are linked to a power source 51. An on-off switch 52 controls delivery of power to the driver motors 55 and 57.

The power source 51 and on-off switch are mounted to the interior of the decoy 50 with a mounting bracket 53. The power source 51 comprises two standard 1.5-volt size D batteries. Variations in the number and type of power source is within the scope of this invention. Further, a radio-controlled on-off switch could also be used with this invention. The driver motors could also vary the speed of the driver motors, together or individually, which would give the user greater control and flexibility over the visual effects and motion. It is also possible to use the invention with an oscillating action rather than continuous rotation.

As shown on FIG. 5, the offset support assembly (not shown) would be attached to the output shafts 58 and 59 of driver motors 57 and 55, respectively. As the driver motors 57 and 58 rotates the output shafts 58 and 59, the offset support assembly attached to the output shafts will rotate around a longitudinal axis defined along the length of the output shaft. The attachment brackets on offset support assembly (not shown) allows for one or more appendages to be attached to the offset support assembly. When wing appendages (or other appendages) are attached to the offset support assembly, these appendages will rotate in a circular direction around the longitudinal axis defined by the output shaft.

Offset Support Assembly

Figure 6:
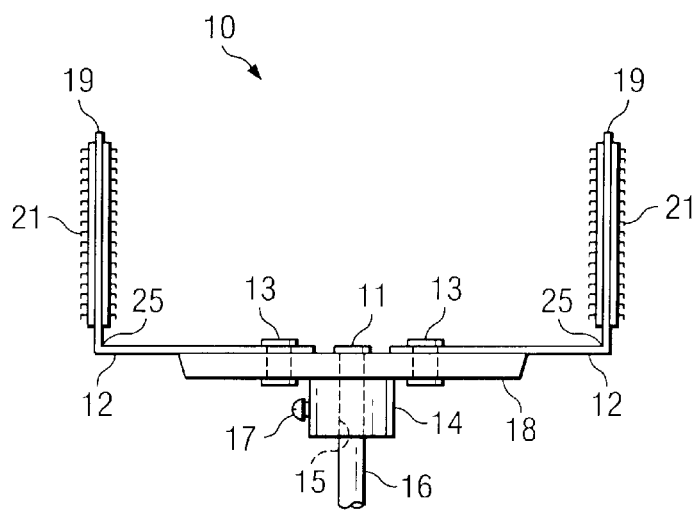
FIG. 6 shows a sectional profile view of one embodiment of the offset support assembly with two long attachment brackets set at a 90° inclination angle.
Figure 7:
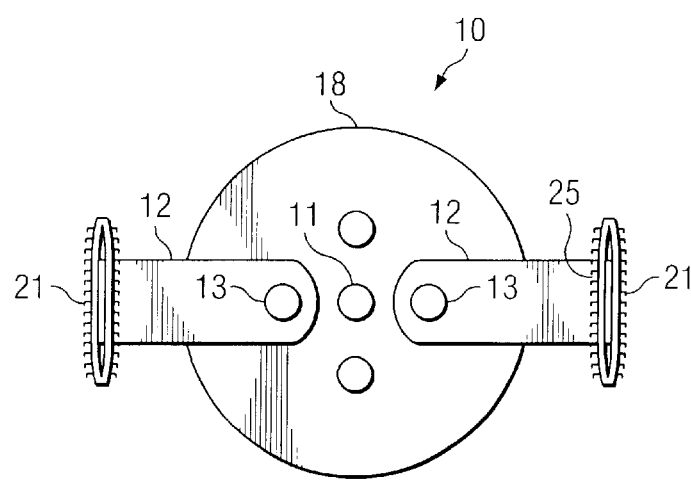
FIG. 7 shows a top view of one embodiment of the offset support assembly with two long attachment brackets set at a 90° inclination angle.

The offset support assembly 10 is shown in FIG. 6 and FIG. 7. In FIG. 6 and FIG. 7, the offset support assembly 10 generally consists of a hub 11 for connection to an output shaft 16, an attachment bracket 12 for attaching one or more wing appendages 430 and/or foot appendages 440. The hub 11 preferably includes a cylindrical collar 14 with a central aperture 15 to receive an output shaft 16 of the driver motor. A planar disk 18 is coaxially aligned with and interconnected to collar 14. Hub 11 includes a connector, such as an adjustable setscrew 17, extending through the wall of the collar 14, to securely retain the collar 14 on an output shaft 16. The hub 11 is centered on disk 18, in the preferred embodiment, but the attachment brackets 12, or some other attachment structure or equivalent structure may directly attach to hub 11.

The disk 18 in the preferred embodiment is a flat metal or plastic disk approximately 1½" in diameter. The size of disk 18 may be varied, but the disk 18 should be large enough to fit two or more attachment brackets 12. The embodiment depicted in FIG. 6 and 7 in offset assembly 10 has two attachment brackets 12, but more than two attachment bracket can be placed on offset assembly 10.

Each attachment bracket 12 is formed as a generally L-shaped member attached to the disk 18. The attachment bracket 12 is a flat, narrow strip of a stiff material formed into an L-shaped structure. In the preferred embodiment, this is a metal strip approximately ½" wide and 2" long. Each attachment bracket 12 has an opposing attachment bracket located directly across from it so that the two opposing brackets 12, the hub 11, and the disk 18 form a U-shaped member of the offset assembly. The distance separating the ends 19 of the offset assembly 10 is approximately 2¼" in diameter. In offset assembly 10, the angle of inclination formed by the bracket's bend 25 is between 90° (e.g. attachment bracket 12) and 135° (e.g. attachment bracket 212). The inclination angle 25 depicted in FIG. 6 is 90°. The extended ends 19 of the attachment brackets 12 are where the appendages are attached to the offset assembly 10. The attachment brackets 12 are attached to the disk 18 using rivets 13, but any form of screws or nuts/bolts/washers combination may be acceptable.

The wing appendage 430 or foot paddle appendage 440 are attached to the end of the attachment bracket 19. The attachment bracket 19 has a sleeve 21 formed from the loop portion of a hook and loop connecting material (e.g. Velcro®). This material is permanently attached to the attachment bracket end 19 and entirely covers the end 19 of the attachment bracket 12. The sleeve 21 covers both sides of the end 19, so that appendages can be attached on either side, and two appendages 430 and 440 can be affixed on the same attachment bracket 12 at the same time (e.g. a wing 430 on one side and a paddle 440 on the other side) or at different times.

Varying factors such as attachment bracket length and inclination angle can produce variations in the appearance of the rotating assembly. In a typical embodiment for a decoy approximately 20" in length, the distance between the attachment bracket ends 19 is approximately 2¼". The length of attachment bracket 12 is approximately 2" with the length of the leg of the bracket 12 of approximately 1". The disk 18 will have a diameter of approximately 1½".

As an alternate embodiment, rather than being a fixed distance or length, the wing attachment bracket 12 can be made adjustable in either respect by, for example, using overlapping slotted components with screws to attach the brackets 12 to the disk 18. Different attachment points could also be made in disk 18 to vary the length of the leg of attachment bracket 12 in relation to the hub 11. Further, the offset assembly 10 can be composed of single or multiple machined or single or multiple molded parts. Additionally, the appendages may be molded or permanently attached to the offset assembly 10.

Figure 8:
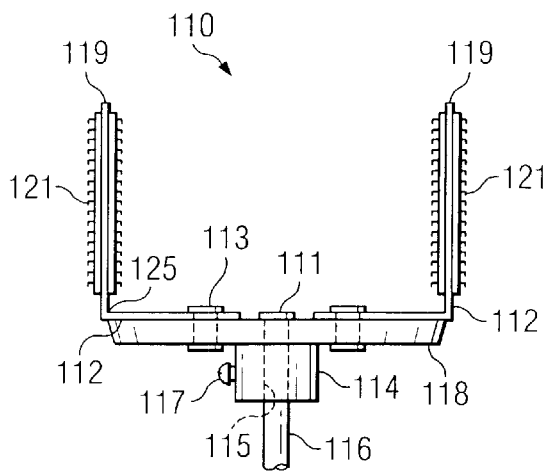
FIG. 8 shows a sectional profile view of one embodiment of the offset support assembly with two short attachment brackets set at a 90° inclination angle
Figure 9:
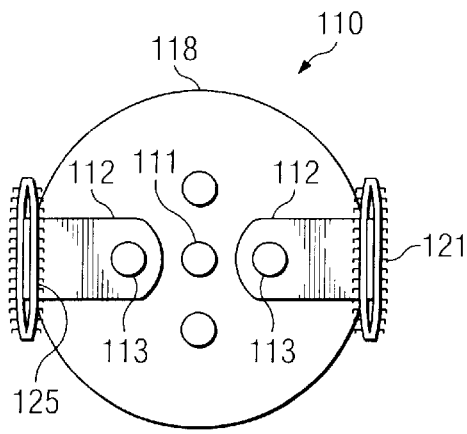
FIG. 9 shows a top view of one embodiment of the offset support assembly with two short attachment brackets set at a 90° inclination angle.

FIG. 8 and FIG. 9 depict another preferred embodiment of an offset support assembly 110. In FIG. 8 and FIG. 9, the offset support assembly 110 generally consists of a hub 111 for connection to a output shaft 116, an attachment bracket 112 for attaching one or more wing appendages 430 and/or foot appendages 440. The hub 111 preferably includes a cylindrical collar 114 with a central aperture 115 to receive a output shaft 116 of the driver motor. A planar disk 118 is coaxially aligned with and interconnected to collar 114. Hub 111 includes a connector, such as an adjustable setscrew 117, extending through, the wall of the collar 114, to securely retain the collar 114 on a output shaft 116. The hub 111 is the center of a disk 118, in the preferred embodiment, but the attachment brackets 112, or some other attachment structure or equivalent structure may directly attached to hub 111.

The disk 118 in the embodiment is a flat metal or plastic disk approximately 1½" in diameter. The size of disk 118 may be varied, but the disk 118 should be large enough to fit two or more attachment brackets 112. The embodiment depicted in FIG. 8 and 9 has two attachment brackets 112, but one or more than two attachment brackets is possible.

Each attachment bracket 112 is formed as a generally L-shaped member attached to the disk 118. The attachment bracket 112 is a flat, narrow strip of a stiff material formed into an L-shaped structure. In the embodiment, this is a metal strip approximately ½" wide and 1½" long. Each attachment bracket 112 has an opposing attachment bracket located directly across from it so that the two opposing brackets 112, the hub 111, and the disk 118 form a U-shaped member of the offset assembly 110. The distance separating the ends 119 of the offset assembly 110 are approximately 1½". In offset assembly 110, the angle of inclination formed by the bracket's bend 125 is between 90° and 135°. The angle 125 depicted in FIG. 8 is 90°. The extended ends 119 of the attachment brackets 112 are where the appendages are attached to the offset assembly 110. The attachment brackets 112 are attached to the disk 118 using rivets 113, but any form of screws or nuts/bolts/washers combination may be acceptable.

The wing appendage 430 or paddle appendage 440 are attached to the end of the attachment bracket 119. The attachment bracket 119 has a sleeve 121 formed from the loop portion of a hook and loop connecting material (e.g. Velcro®). This material is permanently attached to the attachment bracket end 119 and entirely covers the end 119 of the attachment bracket 112. The sleeve 121 covers both sides of the end 119, so that appendages can be attached on either side, and two appendages 430 and 440 can be affixed on the same attachment bracket 112 at the same time (e.g. a wing 430 on one side and a paddle 440 on the other) or at different times. Varying factors such as attachment bracket length and inclination angle can produce variations in the appearance of the rotating assembly. In a typical embodiment for a decoy approximately 20" in length, the distance between the attachment bracket ends 119 is approximately 1½", and the length of attachment bracket 112 is approximately 1½" with the length of the leg of the bracket 112 of approximately ¾", with the disk 118 having a diameter of approximately 1½".

As an alternate embodiment, rather than being a fixed distance or length, the wing attachment bracket's 112 can be made adjustable in either respect by, for example, using overlapping slotted components with screws to attach the brackets 112 to the disk 118. Different attachment points could also be in disk 118 to vary the length of the leg of attachment bracket 112 in relation to the hub 111. Further, the offset assembly 110 can be composed of single or multiple machined or single or multiple molded parts. Additionally, the appendages may be molded or permanently attached to the offset assembly 110.

Figure 10:
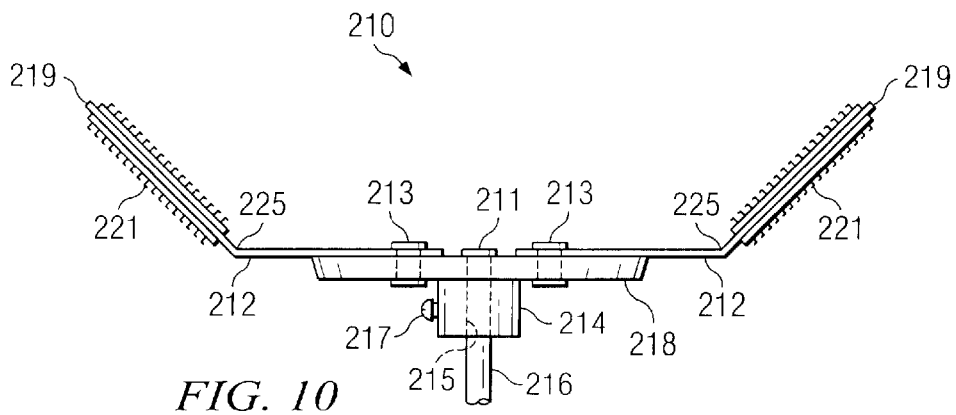
FIG. 10 shows a sectional profile view of one embodiment of the offset support assembly with two long attachment brackets set at a 135° inclination angle.
Figure 11:
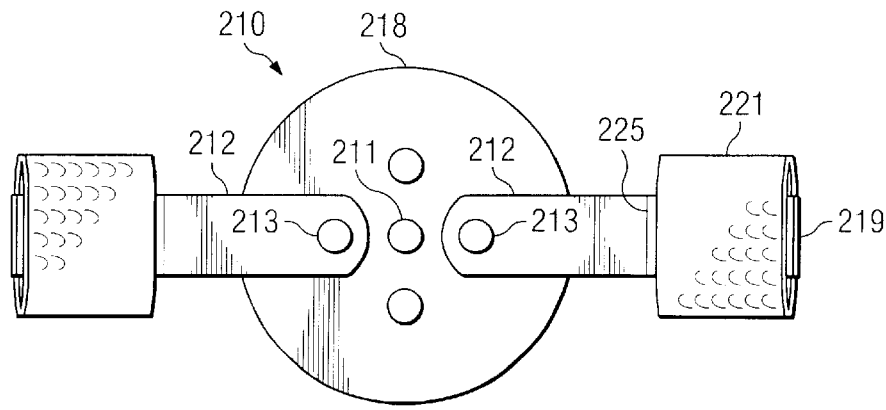
FIG. 11 shows a top view of one embodiment of the offset support assembly with two long attachment brackets set at a 135° inclination angle.

FIG. 10 and FIG. 11 depict another preferred embodiment of an offset support assembly 210. In FIG. 10 and FIG. 11, the offset support assembly 210 generally consists of a hub 211 for connection to an output shaft 216, an attachment bracket 212 for attaching one or more wing appendages 430 and/or foot appendages 440. The hub 211 preferably includes a cylindrical collar 214 with a central aperture 215 to receive an output shaft 216 of a driver motor. A planar disk 218 is coaxially aligned with and interconnected to collar 214. Hub 211 includes a connector, such as an adjustable setscrew 217, extending through the wall of the collar 214, to securely retain the collar 214 on a output shaft 216. The hub 211 is the center of a disk 218, in the preferred embodiment, but the attachment brackets 212, or some other attachment structure or equivalent structure may directly attached to hub 211.

The disk 218 in the embodiment is a flat metal or plastic disk approximately 1½/" in diameter. The size of disk 218 may be varied, but the disk 218, should be large enough to fit two or more attachment brackets 212. The embodiment depicted in FIGS. 10 and 11 has two attachment brackets 212, but one or more than two is possible.

Each attachment bracket 212 is formed as a generally L-shaped member attached to the disk 218 of hub 211. The attachment bracket 212 is a flat, narrow strip of a stiff material formed into an L-shaped structure. In the preferred embodiment, this is a metal strip approximately ½" wide and 2" long. In this preferred embodiment, each attachment bracket 212 has an opposing attachment bracket located directly across from it so that the two opposing brackets 212, the hub 211, and the disk 218 form a U-shaped member of an offset assembly 210. The distance separating the ends 219 is approximately 3½". In offset assembly 210, the angle of inclination is between 90° and 135°. The angle 225 depicted in FIG. 10 is 135°. The extended ends 219 of the attachment brackets 212 are where the appendages are attached. The attachment brackets 212 are attached to the disk 218 using rivets 213, but any form of screws or nuts/bolts/washers combination may be acceptable.

The wing appendage 430 or paddle appendage 440 are attached to the end of the attachment bracket 219. The attachment bracket 219 has a sleeve 221 formed from the loop portion of a hook and loop connecting material (e.g. Velcro®). This material is permanently attached to the attachment bracket end 219 and entirely covers the end 219 of the attachment bracket 212. The sleeve 221 covers both sides of the end 219, so that appendages can be attached on either side, and two appendages 430 and 440 can be affixed on the same attachment bracket 212 at the same time (e.g. a wing 430 on one side and a paddle 440 on the other) or at different times.

Varying factors such as attachment bracket length and inclination can produce variations in the appearance of the rotating assembly. In a typical embodiment for a decoy approximately 20" in length, the distance between the attachment bracket ends 219 is approximately 3½", and the length of attachment bracket 212 is approximately 2" with the length of the leg of the bracket 212 of approximately 1". The disk 218 has a diameter of approximately 1½".

As an alternate embodiment, rather than being a fixed distance or length, the wing attachment bracket's 212 can be made adjustable in either respect by, for example, using overlapping slotted components with screws to attach the brackets 212 to the disk 218. Different attachment points could also be in disk 218 to vary the length of the leg of attachment bracket 212 in relation to the hub 211. Further, the offset assembly 210 can be composed of single or multiple machined or single or multiple molded parts. Additionally, the appendages may be molded or permanently attached to the offset assembly 210.

Figure 12:
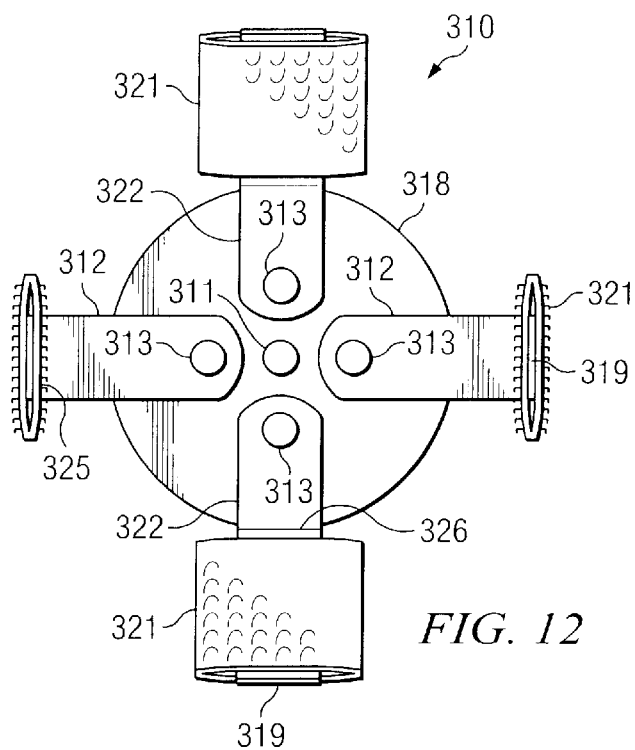
FIG. 12 shows a top view of one embodiment of the offset support assembly with four attachment brackets, two short ones set at a 90° inclination angle, ad two long ones set at a 135° inclination angle.

FIG. 12 depicts another preferred embodiment of an offset support assembly 310. In FIG. 12, the offset support assembly 310 has four attachment brackets, and it generally consists of a hub 311 for connection to a output shaft 316, and attachment brackets 312 and 322 for attaching one or more of elongated wing appendages 430 and/or foot appendages 440. The hub 311 preferably includes a cylindrical collar 314 with a central aperture 315 to an output shaft 316 of a driver motor. A planar disk 318 is coaxially aligned with and interconnected to collar 314. Hub 311 includes a connector, such as an adjustable setscrew 317, extending through the wall of the collar 314, to securely retain the collar 314, on output shaft 316. The hub 311 is the center of a disk 318, in the embodiment, but the attachment brackets 312 and 322, or some other attachment structure or equivalent structure may directly attached to hub 311.

The disk 318 in the embodiment is a flat metal or plastic disk approximately 1½" in diameter. The size of disk 318 may be varied, but the disk 318 should be large enough to fit two or more attachment brackets 312 or 322. The embodiment depicted in FIG. 12 has two attachment brackets 312, but one or more than two is possible. The embodiment also has two attachment brackets 322 attached, but one or more than two is possible.

Each attachment bracket 312 and 322 is formed as a generally L-shaped member attached to the disk 318 of hub 311. The attachment bracket 312 and 322 is a flat, narrow strip of a stiff material formed into an L-shaped structure. For attachment bracket 312, this is a metal strip approximately ½" wide and approximately 2¼" long, and for attachment bracket 322, this is a metal strip approximately ½" wide and 1½" long. Each attachment bracket 312 and 322 has an opposing attachment bracket 312 or 322 located directly across from it so that the two opposing brackets 312 and 322, the hub 311, and the disk 318 form a U-shaped member of the offset assembly 310. The distance separating the ends 319 of the offset assembly 310 is approximately 2½". In the offset assembly 310, the inclination angle 325 and 326 is between 90° and 135°. The angle 325 depicted in FIG. 12 is 90°, and the angle 326 depicted in FIG. 12 is 135°. The extended ends 319 of the attachment brackets 312 and 322 are where the appendages are attached. The attachment brackets 312 and 322 are attached to the disk 318 using rivets 313, but any form of screws or nuts/bolts/washers combination may be acceptable.

The wing appendage 430 or paddle appendage 440 are attached to the end of the attachment bracket 319. The attachment bracket 319 has a sleeve 321 formed from the loop portion of a hook and loop connecting material (e.g. Velcro®). This material is permanently attached to the attachment bracket end 319 and entirely covers the end 319 of the attachment bracket 312 and 322. The sleeve 321 covers both sides of the end 319, so that appendages can be attached on either side, and two appendages 430 and 440 can be affixed on the same attachment bracket 312 and 322 at the same time (e.g. a wing 430 on one side and a paddle 440 on the other) or at different times.

Varying factors such as attachment bracket length and inclination angle can produce variations in the appearance of the rotating assembly. In a typical embodiment for a decoy approximately 20" in length, the distance between the attachment bracket ends 319 of attachment brackets 312 is approximately 2½", and the length of attachment bracket 312 is approximately 2¼" with the length of the leg of the bracket 312 of approximately 1¼", with the disk 318 having a diameter of approximately 1½". In a typical embodiment for a decoy approximately 20" in length, the distance between the attachment bracket ends 319 of attachment brackets 322 is approximately 2½", and the length of attachment bracket 322 is approximately 1¾" with the length of the leg of the bracket 322 of approximately ½", with the disk 318 having a diameter of approximately 1½".

As an alternate embodiment, rather than being a fixed distance or length, the wing attachment bracket's 312 and 322 can be made adjustable in either respect by, for example, using overlapping slotted components with screws to attach the brackets 312 to the disk 318. Different attachment points could also be in disk 318 to vary the length of the leg of attachment bracket 312 and 322 in relation to the hub 311. Further, the offset assembly 310 can be composed of single or multiple machined or single or multiple molded parts. Additionally, the appendages may be molded or permanently attached to the offset assembly 310.

The inclination angle 25, 125, 225, 325 and 326 formed by the bend at the base of "L" of the attachment bracket 12, 112, 212, 312, and 322 may be varied. In the preferred embodiment, the angle 25, 125, 225, 325, and 326 will range between 90° and 135° relative to the base of the disk 18, 118, 218, and 318. However, although these angles produces what is considered the most realistic visual quality of flapping wings, the angle 25, 125, 225, 325, and 326 may be less than 90° or more than 135°. The inclination angle 25, 125, 225, 325, and 326 formed by the attachment brackets 12, 112, 212, 312, and 322 on the offset support assembly 10, 110, 210, and 310 may also be different on the same offset assembly. Opposing brackets 12, 112, 212, 312, and 322 may be of equal or different angles or lengths on the same offset support assembly 10, 110, 210, and 310.

Structurally, the disk 18, 118, 218, and 318 may be eliminated from the hub 11, 111, 211, and 311, and the attachment brackets 12, 112, 212, 312, and 322 connected directly to the collar 14, 114, 214, and 314 or integrally formed with the collar 14, 114, 214, and 314 in a fashion similar to a windmill or spokes on a wagon wheel. In another structural variation, the appendages could be attached directly to the collar 14, 114, 214, and 314, hub 11, 111, 211, and 311, or disk 18, 118, 218, 318 with the attachment bracket 12, 112, 212, 312, and 322 eliminated from the design. In yet another variation, rather than having an even number of attachment brackets 12, 112, 212, 312, and 322 with an opposing attachment bracket 12, 112, 212, 312, and 322 there may be an odd number of attachment brackets 12, 112, 212, 312, and 322 (e.g. 3 or 5). In yet another variation, a U-shaped cup with a hub or other attachment structure at the base of the "U" may be substituted for the disk 18, 118, 218, and 318 with the appendages attached to the lips or sides of the cup, such that the cup replaces and performs the same function as the attachment brackets 12, 112, 212, 312, and 322. In yet another variation, the offset support assembly could be molded such that the hub 11, 111, 211, 311, collar 14, 114, 214, and 314, and disk 18, 118, 218, and 318 and support brackets 12, 112, 212, 312, and 322 are a one-piece structure. In another variation, one or more wing appendages 430 and/or foot appendages 440 could be molded in some fashion with an offset assembly in a single structure. One aspect of the invention—the offset rotating wing and/or paddle appendage —would be supported in these alternative embodiments.

Wings

Figure 13:
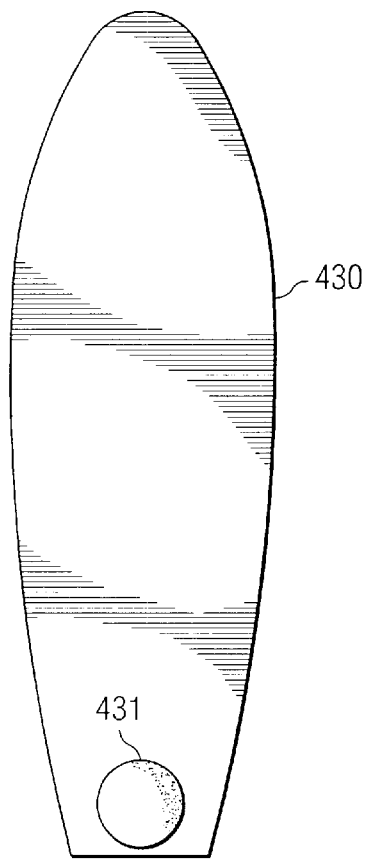
FIG. 13 show's a top view of a wing appendage of the invention.

The wing appendages 430 shown in FIG. 13 are preferably formed as an elongated planar body contoured to mimic the general shape of a bird's wing. The base of the wing can be firmly affixed to the attachment bracket 12 (FIG. 6 and FIG. 7), 112 (FIG. 8 and FIG. 9), 212 (FIG. 10 and FIG. 11), and 312 and 322 (FIG. 12). In the preferred embodiment, the wing 430 would have a pair of disks 431 (or strips) of the hook portion of hook and loop material matching the loop portion of the material used to form sleeve 21 (FIG. 6 and FIG. 7), 121 (FIG. 8 and FIG. 9), 221 (FIG. 10 and FIG. 11), and 321 (FIG. 12) (e.g. Velcro®). A similar disk 431 can also be attached to each side of the wing appendage 430.

When a disk 431 is pressed against sleeve 21 (FIG. 6 and FIG. 7), 121 (FIG. 8 and FIG. 9), 221 (FIG. 10 and FIG. 11), and 321 (FIG. 12) the hooks engage the loops to securely, but easily removably, attach the wing appendage 430 to the attachment bracket 12 (FIG. 6 and FIG. 7), 112 (FIG. 8 and FIG. 9), 212 (FIG. 10 and FIG. 11), and 312 and 322 (FIG. 12). The wing appendages 430 are attached generally extending along the same longitudinal axis as the output shaft 16 (FIG. 6 and FIG. 7), 116 (FIG. 8 and FIG. 9), 216 (FIG. 10 and FIG. 11), and 316 (FIG. 12) of the associated offset bracket 12 (FIG. 6 and FIG. 7), 112 (FIG. 8 and FIG. 9), 212 (FIG. 10 and FIG. 11), and 312 and 322 (FIG. 12).

The wing appendage 430 may be attached in an extended manner directly outward from the attachment bracket 12 (FIG. 6 and FIG. 7), 112 (FIG. 8 and FIG. 9), 212 (FIG. 10 and FIG. 11), and 312 and 322 (FIG. 12) or it may be attached at an angle outward from the attachment bracket (for example 45° from the plane of rotation). The wing appendage 430 may also be attached to the inner or outer side of sleeve 21 (FIG. 6 and FIG. 7), 121 (FIG. 8 and FIG. 9), 221 (FIG. 10 and FIG. 11), and 321 (FIG. 12).

When used with a decoy, a pair of output shafts 58 and 59 extend outward from the body of the decoy 50. The offset assembly 10 (FIG. 6 and FIG. 7), 110 (FIG. 8 and FIG. 9), 210 (FIG. 10 and FIG. 11), and 310 (FIG. 12) is mounted upon the output shafts 58 and 59 by means of the hub 11 (FIG. 6 and FIG. 7), 111 (FIG. 8 and FIG. 9), 211 (FIG. 10 and FIG. 11), and 311 (FIG. 12) and collar 14 (FIG. 6 and FIG. 7), 114 (FIG. 8 and FIG. 9), 214 (FIG. 10 and FIG. 11), and 314 (FIG. 12). When the output shaft 58 and 59 rotates, the wing appendages 430 on the offset assemblies revolve around the longitudinal axis of the output shafts 58 and 59. The right side shaft 59 rotates clockwise, and the left side shaft 58 rotates counterclockwise, so that the offset assemblies 10 (FIG. 6 and FIG. 7), 110 (FIG. 8 and FIG. 9), 210 (FIG. 10 and FIG. 11), and 310 (FIG. 12) rotate down in the front and up in the back of the decoy 50.

The wing appendages 430 extend outward from the respective sides of the decoy 50 and rotate around the longitudinal axis of shafts 58 and 59 in this circular fashion. When viewed at an angle to the longitudinal axis, the rotating wing appendages 430 appear to move back and forth across the axis of the output shafts 58 and 59. When viewed by an observer, the wing appendages 430 appear to move "up and down" and "back and forth." The apparent "axis crossing" motion of the wing appendages 430 simulate the flapping movements by live birds, and imparts a unique and lifelike appearance to the decoy from a distance.

It is preferred that the wing appendages 430 be formed with a basic wing shape and constructed of a resilient, shape-retentive material that temporarily deforms from a planar configuration in response to the centrifugal force of the revolving wing assembly 10 (FIG. 6 and FIG. 7), 110 (FIG. 8 and FIG. 9), 210 (FIG. 10 and FIG. 11), and 310 (FIG. 12). As the wing assembly rotates, the wing appendages tend to "flare-out" from the axis of rotation from the centrifugal force. This causes the tips of the wings to generally flare outward more than the inner ends and enhances the appearance of flapping wings. In the preferred embodiment for a decoy about 20" long, the size is approximately 7½" long by 2½" wide, but the size may be varied.

The wing appendage 430 need not be uniform in size, but can be shorter or longer and narrower or wider than the other wing appendages. Different lengths may be used on opposing or adjacent brackets to produce slightly different optical qualities or movement effects. Although the preferred embodiment is a roughly wing-shaped structure, the wings can be simple, elongated strips of material. Moreover, the wings can be constructed of a stiff rather than flexible material.

The number of wing appendages 430 attached to the brackets may also be varied. In the preferred embodiment, two wing appendages 430 are attached to each offset support assembly 10 (FIG. 6 and FIG. 7), 110 (FIG. 8 and FIG. 9), 210 (FIG. 10 and FIG. 11), and 310 (FIG. 12). One wing appendage is attached to each of two opposing attachment brackets 12 (FIG. 6 and FIG. 7), 112 (FIG. 8 and FIG. 9), 212 (FIG. 10 and FIG. 11), and 312 and 322 (FIG. 12). One or more wing appendages will give an acceptable optical effect, though the preferred number is two.

The number of wing appendages 430 that can be mounted on an offset support assembly 10 (FIG. 6 and FIG. 7), 110 (FIG. 8 and FIG. 9), 210 (FIG. 10 and FIG. 11), and 310 (FIG. 12) is only limited by the number of attachment points on the attachment brackets 12 (FIG. 6 and FIG. 7), 112 (FIG. 8 and FIG. 9), 212 (FIG. 10 and FIG. 11), and 312 and 322 (FIG. 12). By attachment points, the appendage can be place on either side of sleeve 21 (FIG. 6 and FIG. 7), 121 (FIG. 8 and FIG. 9), 221 (FIG. 10 and FIG. 11), and 321 (FIG. 12). Further attachment points include the attachment bracket ends 19 (FIG. 6 and FIG. 7), 119 (FIG. 8 and FIG. 9), 219 (FIG. 10 and FIG. 11), and 319 (FIG. 12).

The color of the wing appendages 430 can also be used to create different visual effects. The wing appendages 430 may be any color. A single color may be used, such as black, gray, white, brown, blue, green, or some other color, or combination of colors may be had for the wing appendage 430. The wing appendage 430 may even be "painted" to more closely represent a wing in appearance from an artistic viewpoint, and each side of the wing appendage 430 may have different coloration.

As previously discussed, unique visual qualities are imparted by the use of a single wing appendage 430 mounted on an offset support assembly 10 (FIG. 6 and FIG. 7), 110 (FIG. 8 and FIG. 9), 210 (FIG. 10 and FIG. 11), and 310 (FIG. 12). However, the use of two wing appendages 430 in contrasting colors (e.g. black/white, brown/gray, brown/white, green/gray, etc.) on the offset support assembly 10 (FIG. 6 and FIG. 7), 110 (FIG. 8 and FIG. 9), 210 (FIG. 10 and FIG. 11), and 310 (FIG. 12) enhances the optical appearance of flapping wings. This effect can be further enhanced if the contrasting colored wing appendages 430 are of different lengths.

In one embodiment, a white wing appendage 430 approximately 7½" long is used in concert with a black 6" long wing appendage 430. The visual effect of the alternating, contrasting colored wings of differing lengths rotating about the axis of a drive motor is different when compared with a single or even two wing appendages 430 of the same color mounted on the offset support assembly 10 (FIG. 6 and FIG. 7), 110 (FIG. 8 and FIG. 9), 210 (FIG. 10 and FIG. 11), and 310 (FIG. 12) or two wing appendages 430 of the same length and contrasting color. This ability to easily vary the optical qualities by varying the wing appendage's size, color, shape, flexibility, attachment point, or angle is another unique aspect of the invention.

Paddle Feet

Figure 14:
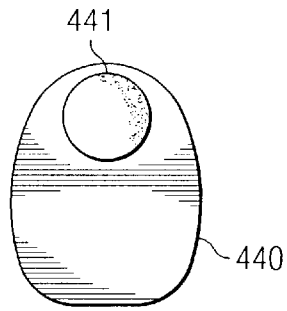
FIG. 14 shows a top view of a foot appendage.

FIG. 14 depicts an embodiment for the paddle appendage 440 which can be attached to the attachment brackets 12 (FIG. 6 and FIG. 7), 112 (FIG. 8 and FIG. 9), 212 (FIG. 10 and FIG. 11), and 312 and 322 (FIG. 12). The paddle appendage 440 is an oval or rectangular shaped structure about 2½" long and 2" in diameter, and is attached to the attachment bracket 12 (FIG. 6 and FIG. 7), 112 (FIG. 8 and FIG. 9), 212 (FIG. 10 and FIG. 11), and 312 and 322 (FIG. 12) so as to extend down into the water.

The paddle appendages 440 provide both propulsion to the decoy and a splashing effect that also enhances the lifelike appearance of the decoy. The paddle appendages 440 can be attached to the attachment brackets in the same manner as the wing appendages. In the preferred embodiment, the appendage may be attached to the offset assembly by a pair of disks 441 or strips of the hook portion of hook and loop material matching the loop portion of the material used to form sleeve 21 (FIG. 6 and FIG. 7), 121 (FIG. 8 and FIG. 9), 221 (FIG. 10 and FIG. 11), and 321 (FIG. 12).

When a disk 41 is pressed against sleeve 21 (FIG. 6 and FIG. 7), 121 (FIG. 8 and FIG. 9), 221 (FIG. 10 and FIG. 11), and 321 (FIG. 12) the hooks engage the loops to securely, but easily removably, attach the paddle appendage 440 to the attachment bracket 12 (FIG. 6 and FIG. 7), 112 (FIG. 8 and FIG. 9), 212 (FIG. 10 and FIG. 11), and 312 and 322. The paddle appendages 440 are attached extending roughly 90° from the longitudinal axis of the associated bracket 12 (FIG. 6 and FIG. 7), 112 (FIG. 8 and FIG. 9), 212 (FIG. 10 and FIG. 11), and 312 and 322 (FIG. 12).

The paddle appendage 440 may be extended directly outward from the bracket 12 (FIG. 6 and FIG. 7), 112 (FIG. 8 and FIG. 9), 212 (FIG. 10 and FIG. 11), and 312 and 322 (FIG. 12) (e.g. 90°) or at an angle (ex. 45°) from the bracket. The angle of placement can vary the extent that the paddle appendage 440 enters the water, and the propulsion force and associated splashing effect.

The modular aspect of the invention is obvious when considering the number of paddle and wing appendages that may be attached. Only one paddle and one wing may be used on a side, or two or more may be attached. The number of appendages on each side can be the same or varied, depending on the visual affects and movement the user desires. In one embodiment, two wing appendages 430 of contrasting colors and lengths and one paddle appendage 440 are attached to each offset attachment assembly 10 (FIG. 6 and FIG. 7), 110 (FIG. 8 and FIG. 9), 210 (FIG. 10 and FIG. 11), and 310 (FIG. 12).

While the invention has been particularly shown and described with respect to preferred embodiments, it will be readily understood that minor changes in the details of the invention may be made without departing from the spirit of the invention.

I claim:

1. A waterfowl decoy, comprising:
   a body portion having a head end, a tail end, and two sides;
   a driver motor having at least one output shaft, wherein said at least one output shaft has a longitudinal axis extending along the length of said at least one output shaft, said longitudinal axis extending outwardly from one or more sides of the decoy body;
   an offset support assembly attached to the at least one output shaft such that the offset support assembly provides rotational movement for an appendage revolving around said longitudinal axis when the at least one output shaft rotates;
   one or more appendages attached to the offset support assembly having an attachment bracket, said one or more appendages positioned a radial length from the longitudinal axis to provide rotational movement completely around said longitudinal axis, and said one or more appendages are on the offset support assembly; and
   said attachment bracket having a first section and a second section, said first section extending laterally from the longitudinal axis and said second section coupled to said first section and extending a radial length from the longitudinal axis in a position allowing for rotational movement around the longitudinal axis, and said one or more appendages directly attached to and extending from an end of said second section to revolve in an offset rotational movement around said longitudinal axis of the at least one output shaft when the at least one output shaft rotates above a water level.

2. The waterfowl decoy of claim 1 wherein the offset support assembly is a single molded structure.

3. The waterfowl decoy of claim 1 wherein the offset support assembly comprises a plurality of molded structures.

4. The waterfowl decoy of claim 1 wherein the offset support assembly is a single machined structure.

5. The waterfowl decoy of claim 1 wherein the offset support assembly comprises a plurality of machined structures.

6. The waterfowl decoy of claim 1 wherein said offset support assembly comprises a supporting disk and one or more attachment brackets, said supporting disk having a hub for securing the offset support assembly to the at least one output shaft and each attachment bracket having the capability of attaching one of said one or more appendages to the offset support assembly.

7. The waterfowl decoy of claim 6 wherein an angle of inclination between the supporting disk and one of the one or more attachment brackets is within the range of 45° to 160°.

8. The waterfowl decoy of claim 6 wherein an angle of inclination between the supporting disk and the one or more attachment brackets can be manually adjusted.

9. The waterfowl decoy of claim 6 wherein the one or more appendages can be attached to one or more positions on the one or more attachment brackets.

10. The waterfowl decoy of claim 1 wherein the one or more appendages are one or more wing structures.

11. The waterfowl decoy of claim 10 wherein one of said one or more wing structures is composed of a resilient, shape-retentive material that bends away from the longitudinal axis during rotation.

12. The waterfowl decoy of claim 1 wherein the one or more appendages are one or more foot paddle structures.

13. The waterfowl decoy of claim 12 wherein one of said one or more foot paddle structures is composed of a resilient, shape-retentive material that touches a water level during rotation.

14. The waterfowl decoy of claim 1 wherein the driver motor has an adjustable speed setting to vary the rotational speed of the at least one output shaft.

15. A waterfowl decoy comprising:
a body portion having a head end, a tail end, and two sides;
a driver motor having at least one output shaft, wherein said at least one output shaft has a longitudinal axis extending laterally along the length of said at least one output shaft, said longitudinal axis extending outwardly from one or more sides of the decoy body;
an offset support assembly having a supporting disk and one or more attachment brackets, said attachment brackets each having a first section and a second section, said first section extending laterally from the longitudinal axis and said second section coupled to said first section and extending a radial length from the longitudinal axis in a position allowing for rotational movement around the longitudinal axis, and one or more appendages directly attached to and extending from an end of said second section, and said supporting disk having a hub for securing the offset support assembly to the at least one output shaft;
said one or more appendages attached to the offset support assembly at the end of one of said second sections of one of the attachment brackets, wherein said one or more appendages provide's) rotational movement completely around said longitudinal axis and said one or more appendages are offset a radial distance from said longitudinal axis on the offset support assembly to revolve in an offset rotational manner around said longitudinal axis of the at least one output shaft when the at least one output shaft rotates above a water level.

16. The waterfowl decoy of claim 15 wherein an angle of inclination between the supporting disk and one of the one or more attachment brackets is within the range of 45° to 160°.

17. The waterfowl decoy of claim 15 wherein an angle of inclination between the supporting disk and the one or more attachment brackets can be manually adjusted.

18. The waterfowl decoy of claim 15 wherein the one or more appendages can be attached to one or more positions on the one or more attachment brackets.

19. The waterfowl decoy of claim 15 wherein the one or more appendages are one or more wing structures.

20. The waterfowl decoy of claim 19 wherein one of said one or more wing structures is composed of a resilient, shape-retentive material that bends away from the longitudinal axis during rotation.

21. The waterfowl decoy of claim 15 wherein the one or more appendages are one or more foot paddle structures.

22. The waterfowl decoy of claim 21 wherein one of said one or more foot paddle structures is composed of a resilient, shape-retentive material that touches a water level during rotation.

23. The waterfowl decoy of claim 15 wherein the driver motor has an adjustable speed setting to vary the rotational speed of the at least one output shaft.

24. The waterfowl decoy of claim 15 wherein the offset support assembly is a single molded structure.

25. The waterfowl decoy of claim 15 wherein the offset support assembly comprises a plurality of molded structures.

26. The waterfowl decoy of claim 15 wherein the offset support assembly is a single machined structure.

27. The waterfowl decoy of claim 15 wherein the offset support assembly comprises a plurality of machined structures.

28. A method for imparting realistic wing movement in a waterfowl decoy comprising the steps of:
providing a decoy with a body, a head end, and a tail end;
providing a driver motor in the decoy with an output shaft, said output shaft having a longitudinal axis extending along the length of said output shaft, said longitudinal axis extending outwardly from one or more sides of the body;
providing an offset assembly on the output shaft with a wing appendage attached to the offset assembly a radial distance from the longitudinal axis;
providing an attachment bracket on said offset assembly, said attachment bracket having a first section and a second section, said first section extending laterally from the longitudinal axis and said second section coupled to said first section and extending a radial length from the longitudinal axis in a position allowing for rotational movement completely around the longitudinal axis;
attaching the wing appendage directly to an end of the second section of the attachment bracket, such that the wing appendage extends from the end of the second section; and
driving the output shaft with the driver motor to cause rotation of the offset assembly and the wing appendage, said wing appendage rotating around a circular path around said longitudinal axis.

29. The waterfowl decoy of claim 28 wherein one or more wing appendages may be attached to the offset assembly.

30. The waterfowl decoy of claim 28 wherein said wing appendage is composed of a resilient, shape-retentive material that bends away from the longitudinal axis during rotation.

31. The waterfowl decoy of claim 28 wherein one or more foot paddle appendages may be attached to the offset assembly.

32. The waterfowl decoy of claim 31 wherein said one or more foot paddle appendages are composed of a resilient, shape-retentive material that touches a water level during rotation.

33. The waterfowl decoy of claim 28 wherein the driver motor has an adjustable speed setting to vary the rotational speed of the output shaft.

* * * * *